June 29, 1937.  D. LA FERNEY  2,085,262
NUT CRACKING MACHINE
Filed Sept. 25, 1934  2 Sheets-Sheet 2
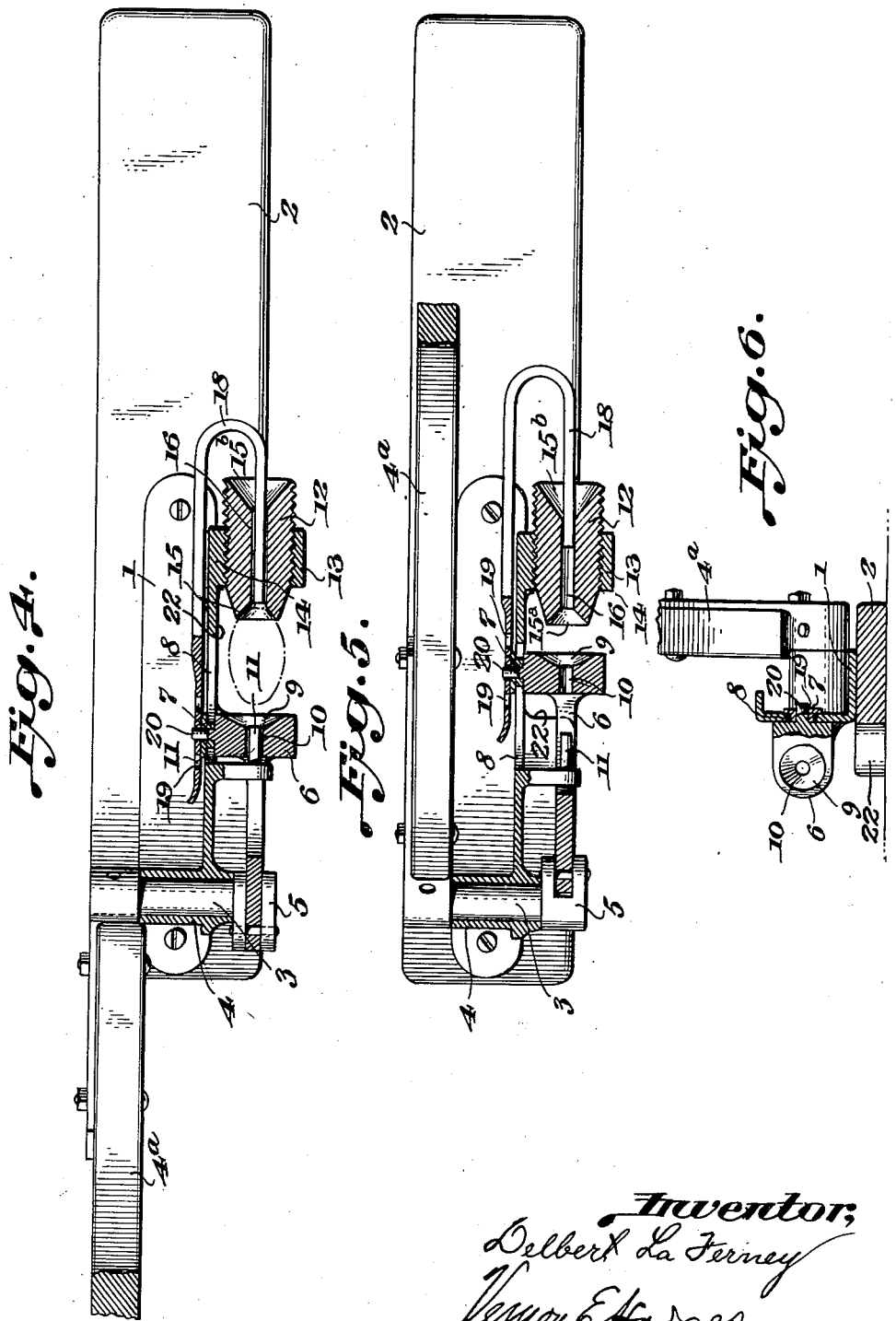

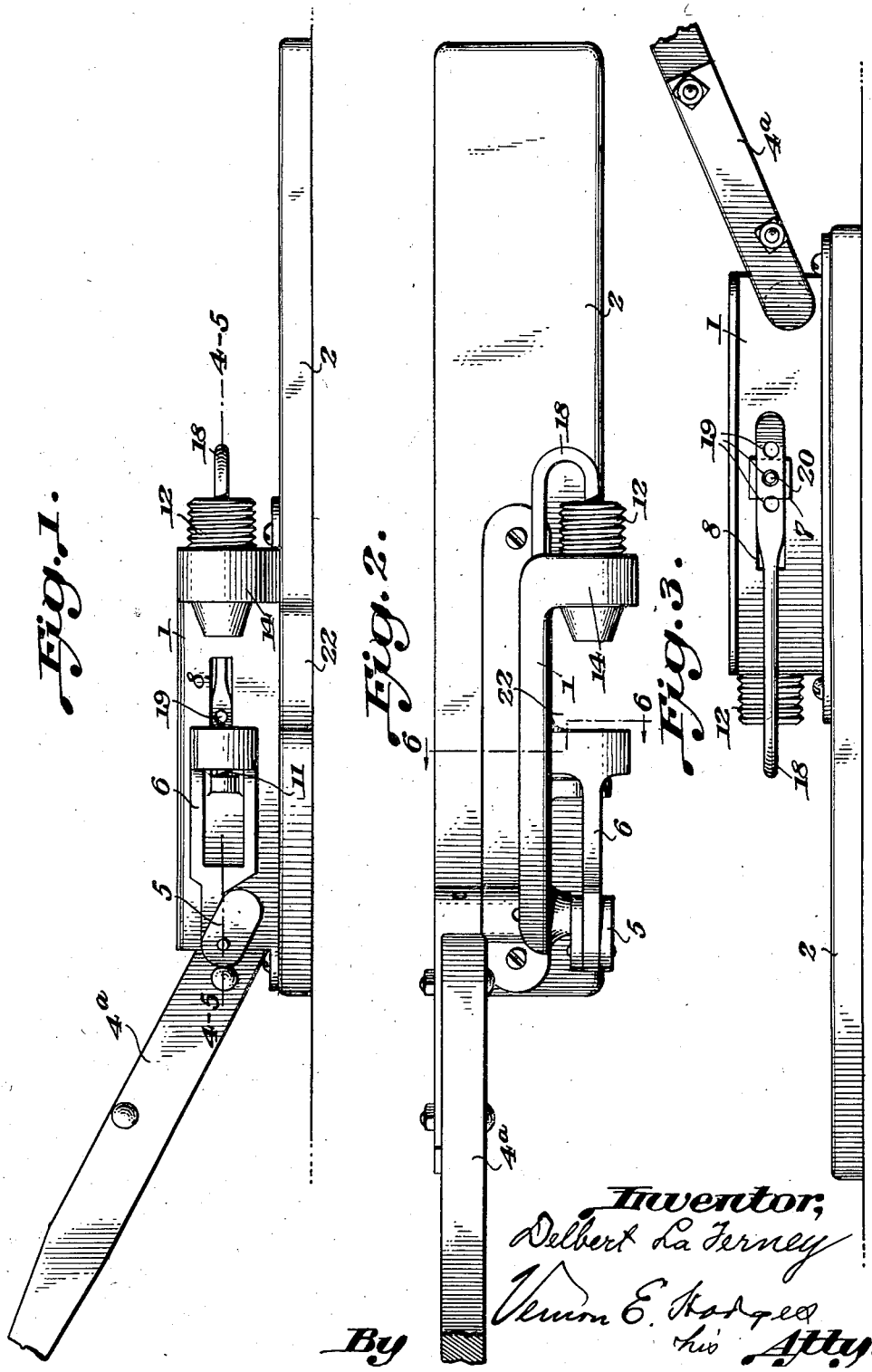

Patented June 29, 1937

2,085,262

UNITED STATES PATENT OFFICE 2,085,262

NUT CRACKING MACHINE

Delbert La Ferney, Pine Bluff, Ark.

Application September 25, 1934, Serial No. 745,458

2 Claims. (Cl. 146—16)

This invention relates to a hand-operated nut-cracking machine for cracking nuts, and more particularly pecans.

The cracking of pecans presents many difficulties since the trade demands unbroken meats so far as possible, and consequently the desideratum is to provide a simple, inexpensive, easily operated, portable device which will crack the shells in such a way that the meats are liberated practically intact and unbroken, thus securing a product which will command the best market price.

It is needless to recite in detail the general type of machines for this purpose which have hitherto been on the market, and the performance of which has been more or less inefficient and imperfect; and yet it might be stated briefly and in a general way that most of these hand-operated machines operate on the screw principle, either by a knurled nut or a crank, and are adapted to be clamped to a table or bench, and in some instances a hand-lever is connected with a reciprocatable plunger which co-operates with an adjustable abutment, both of which have cone-shaped sockets for receiving the opposite ends of the nut, thus providing a simple mechanism and powerful leverage.

My invention is somewhat on the order of the type just mentioned but including important elements which give the machine much greater efficiency and insure the results sought in a simple, inexpensive and easily operated manner.

In the accompanying drawings:

Fig. 1 is a view from one side of the machine;

Fig. 2 is a plan view;

Fig. 3 is a view of the side opposite that shown in Fig. 1;

Fig. 4 is a plan view similar to the view shown in Fig. 2, with parts in horizontal section showing hand-lever and plunger in one extreme position;

Fig. 5 is a view similar to Fig. 4 with the hand-lever and plunger in the opposite extreme position; and Fig. 6 is a section on line 6—6 of Fig. 2 looking in the direction of the arrows.

In its preferred form, as illustrated in the drawings, a frame 1 either cast or perhaps made of channel-iron is constructed and adapted to be mounted upon and secured in any convenient manner to a base 2 of wood or other suitable material, and of sufficient size to afford an adequate support for the machine without making it necessary to clamp or otherwise fasten it upon a table, stand, or other supporting means as is required in most instances, and the construction of the entire device is such as will be understood in the unfolding of this invention that this is possible, since the pressure of the hand-lever while the nut is being cracked is always down toward, and in the direction of, the base.

A shaft 3 is mounted to rock in a bearing 4 at one end of the frame 1. This rock-shaft has a hand-lever 4a secured at one end, and is provided with a crank-arm 5 at the other end.

A reciprocating plunger 6 has a sliding connection with the frame and is guided in its movements back and forth by means of a block 7 pivoted to the side of the plunger and extending through a slot 8 in the frame. This plunger is connected to the crank-arm by a pin, and in that way is reciprocated by the rocking of the hand-lever, shaft and crank-arm.

In one face of the plunger, a cone 9 of proper size and shape is formed to receive one end of the pecan or other nut. A hole 10 is pierced through the very center or apex of the cone, and a stationary extractor stud 11 supported upon and fixed to the frame is arranged in position to enter the hole 10 and clear the latter of any particles of the shell which may have been forced into the hole during the cracking operation, it being understood, of course, that with the forward stroke of the plunger the latter extends on beyond the extractor stud, but with each reverse movement and return stroke of the plunger the extractor stud stands ready to, and exactly does, clear the hole of any material forced therein.

An externally threaded anvil 12 is adjustable in the threaded orifice 13 of the lug 14 at the end of the frame, and extends in direct alignment with the plunger. This anvil has a cone 15 formed in its one end adapted to receive one end of the nut, and a hole 16 is formed longitudinally through the apex of the cone corresponding with the hole 10 in the cone 9 of the plunger 6, and having the same function, but there is this difference: An ejector 18 (in this instance more or less goose-necked or U-shaped) extends through the hole in the anvil and is guided in its movements thereto by the hole, and is connected through the medium of one of the holes 19 located at its inner end with the protruding end of a stud 20 projecting from the plunger 6, so that this ejector moves back and forth as the plunger moves, the two being connected together for convenience. In order to adjust the machine to the size of the nut, the anvil is screwed in or out in the threaded orifice; and to regulate the position of the ejector 18, its position is determined, and the hole in its inner end coming opposite the stud 20 thereby secures the two together in the required relationship.

The threaded anvil 12 is provided with a small cone 15 at one end thereof, which end is provided on the outer edge with a conical surface 15a. The other end of the anvil 12 is provided with a large cone 15b, which corresponds in size with the cone 9 of the plunger 6. The small cone 15 is provided for use in connection with small size or wild pecans, and the conical edge 15a of the anvil is designed so that the operator's fingers may conveniently hold the pecan in adjusted position until the other end of the pecan is engaged by the cone 9 of the plunger 6. The large cone 15b is adapted to fit large or domestic pecans.

A notch or recess 22 is formed in the base immediately beneath the cones of the plunger and anvil so that the nut may drop through the latter into a receptacle below when the plunger is moved in a direction away from the anvil, thereby releasing the cracked nut.

All of these parts are simple, easily assembled or taken apart should occasion require replacement of any worn part. They are easily adjustable, and parts are few and not likely either to wear or get out of order, the leverage is altogether adequate and really powerful, and the direction of pressure is such that the machine rests firmly upon its support without the necessity of clamping or otherwise securing it, unless desired.

A machine of this character when not in use is so constructed and arranged that the hand-lever can be swung around parallel with the base, and the entire device is thus easily packed or stored away when shipped or when not in use.

I claim:

1. A nut cracking machine including a frame having a guide slot therein, a reciprocating plunger having a sliding connection with the frame, a block pivoted to the side of the plunger and extending through the slot in the frame, means for actuating the plunger, the plunger having a hole extending axially therethrough, a stationary extractor stud supported upon and fixed to the frame and arranged in position to enter the hole in the plunger and clear the latter of any particles of shell which may have been forced into the hole during the cracking operation, an externally threaded anvil adjustable in a threaded orifice in the frame, said anvil extending in direct alignment with the plunger and having a hole extending longitudinally therethrough, and an ejector extending into said hole in the anvil and connected with the plunger, whereby its movements are positively controlled by the plunger.

2. A nut cracking machine including a frame having a guide slot therein, a reciprocating plunger having a sliding connection with the frame, means for actuating the plunger, the plunger having a hole extending axially therethrough, a stationary extractor stud supported upon and fixed to the frame and arranged in position to enter the hole in the plunger and clear the latter of any particles of shell which may have been forced into the hole during the cracking operation, an externally threaded anvil adjustable in a threaded orifice in the frame, said anvil extending in direct alignment with the plunger and having a hole extending longitudinally therethrough, and an ejector extending into said hole in the anvil and connected with the plunger, whereby its movements are positively controlled by the plunger.

DELBERT LA FERNEY.